United States Patent
Hemingway et al.

(10) Patent No.: US 7,614,222 B2
(45) Date of Patent: Nov. 10, 2009

(54) SYSTEM AND METHOD FOR DIRECTING FLUID FLOW

(75) Inventors: Mark D. Hemingway, Columbiaville, MI (US); Haskell Simpkins, Grand Blanc, MI (US); Joachim Kupe, Davisburg, MI (US)

(73) Assignee: Delphi Technologies, Inc., Troy, MI (US)

( * ) Notice: Subject to any disclaimer, the term of this patent is extended or adjusted under 35 U.S.C. 154(b) by 308 days.

(21) Appl. No.: 11/193,661

(22) Filed: Jul. 29, 2005

(65) Prior Publication Data

US 2007/0022744 A1    Feb. 1, 2007

(51) Int. Cl.
*F01N 7/00* (2006.01)
(52) U.S. Cl. .............. 60/324; 60/274; 60/286; 60/295; 60/301; 60/303; 239/399; 239/432
(58) Field of Classification Search .......... 60/274, 60/286, 288, 295, 297, 301, 303, 309, 324; 239/399, 432

See application file for complete search history.

(56) References Cited

U.S. PATENT DOCUMENTS

| 4,183,896 | A | * | 1/1980 | Gordon | 422/168 |
| 5,052,178 | A | * | 10/1991 | Clerc et al. | 60/274 |
| 5,570,576 | A | * | 11/1996 | Ament et al. | 60/300 |
| 5,619,853 | A | * | 4/1997 | Brown | 60/288 |
| 6,722,123 | B2 | * | 4/2004 | Liu et al. | 60/286 |
| 7,152,396 | B2 | * | 12/2006 | Cheng | 60/286 |
| 7,249,455 | B2 | * | 7/2007 | Tumati et al. | 60/287 |

\* cited by examiner

*Primary Examiner*—Binh Q Tran
(74) *Attorney, Agent, or Firm*—Thomas N. Twomey

(57) ABSTRACT

In one embodiment, a flow switch can comprise: a deflector having a diverging upstream portion; an aperture located in a downstream portion of the deflector; and a divider disposed downstream of the deflector. The deflector can be capable of diverting a fluid stream that contacts the upstream portion, around the deflector. The aperture can be capable of allowing a flow of a displacing fluid such that the displacing fluid can inhibit the diverted fluid stream from converging to pass through the divider. The divider can be capable of allowing a flow of the displacing fluid therethrough.

11 Claims, 2 Drawing Sheets

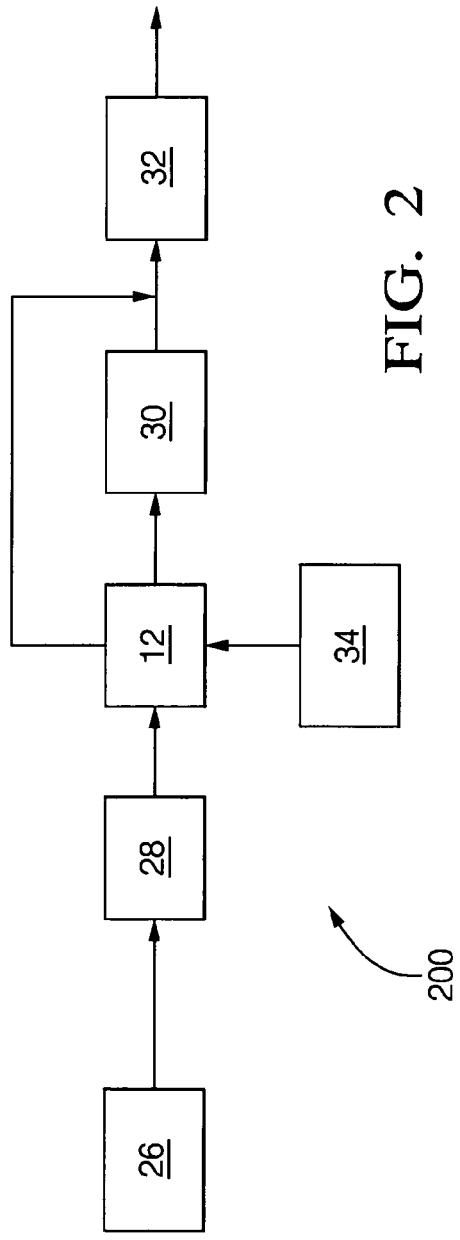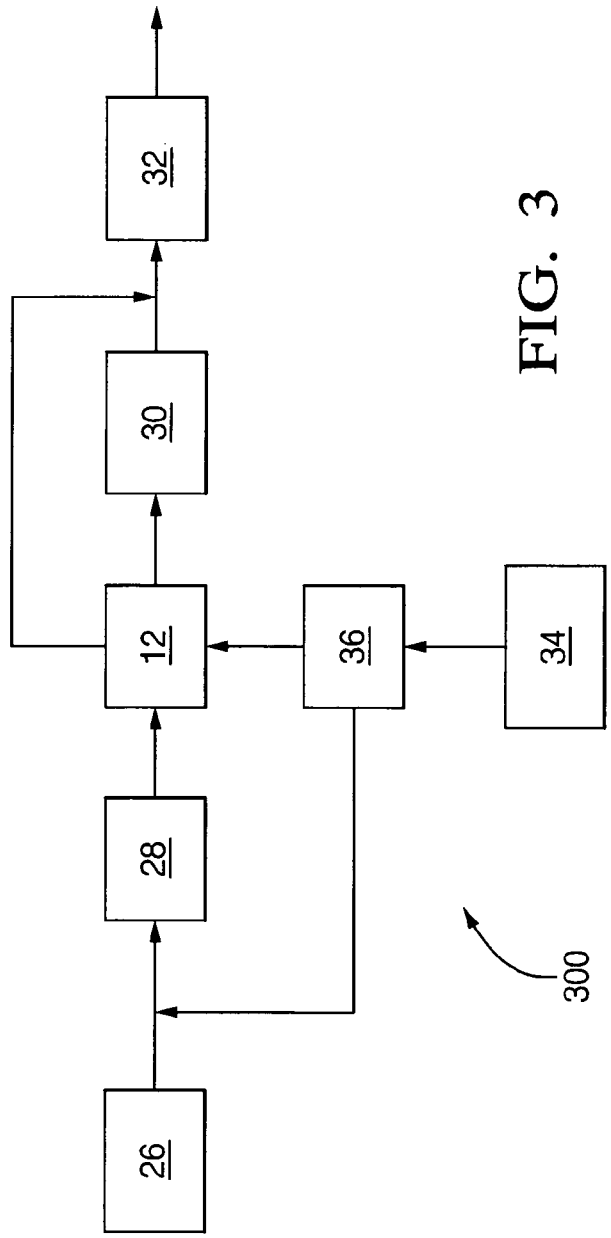

SYSTEM AND METHOD FOR DIRECTING FLUID FLOW

BACKGROUND

Mechanical valves and actuators face significant challenges in harsh environments and heavy use conditions. For example, in the automotive industry mechanical valves and actuators are used in exhaust systems to divert flow to various treatment components (e.g., reformate to a particulate filter for regeneration, ammonia to a selective catalytic reduction catalyst for reduction of nitric oxides, and the like). Unfortunately, the functional lives of mechanical valves are shortened by the harsh environment of the exhaust system and the multiple cycles required over the life of the vehicle.

What are continually needed in the art are improved systems and methods of directing fluid flow.

SUMMARY

Disclosed herein are systems and methods of directing fluid flow. In one embodiment, a flow switch can comprise: a deflector having a diverging upstream portion; an aperture located in a downstream portion of the deflector; and a divider disposed downstream of the deflector. The deflector can be capable of diverting a fluid stream that contacts the upstream portion, around the deflector. The aperture can be capable of allowing a flow of a displacing fluid such that the displacing fluid can inhibit the diverted fluid stream from converging to pass through the divider. The divider can be capable of allowing a flow of the displacing fluid therethrough.

In one embodiment, an exhaust treatment system can comprise: an exhaust treatment device disposed in-line; a flow switch disposed in-line, upstream of and in fluid communication with the exhaust treatment device, and a displacing fluid source in fluid communication with the aperture. The flow switch can comprise a deflector having a diverging upstream portion; an aperture located in a downstream portion of the deflector; and a divider disposed downstream of the deflector. The deflector can be capable of diverting a fluid stream that contacts the upstream portion, around the deflector. The aperture can be capable of allowing a flow of a displacing fluid such that the displacing fluid can inhibit the diverted fluid stream from converging to pass through the divider. The divider can be capable of allowing a flow of the displacing fluid therethrough.

In one embodiment, a method of treating an exhaust stream can comprise: generating an exhaust fluid flow; diverting the exhaust fluid flow with a deflector; converging the diverted exhaust fluid flow; passing the converged fluid flow through a divider; treating the converged exhaust fluid in an exhaust treatment device; and regenerating the exhaust treatment device. Regenerating the exhaust treatment device can comprise introducing a displacing fluid to the deflector, wherein the displacing fluid passes through an aperture and inhibits the passing of the exhaust fluid flow through the divider, passing the displacing fluid through the divider and into the exhaust treatment device, and regenerating the exhaust treatment device.

The above-described and other features will be appreciated and understood by those skilled in the art from the following detailed description, drawings, and appended claims.

BRIEF DESCRIPTION OF THE DRAWINGS

Referring now to the figures, which are exemplary embodiments, and wherein the like elements are numbered alike:

FIG. 2 is a schematic view of an exemplary embodiment of an exhaust treatment system including a dynamic flow switch; and FIG. 3 is a schematic view of another exemplary embodiment of an exhaust treatment system.

DETAILED DESCRIPTION

Figure 1:
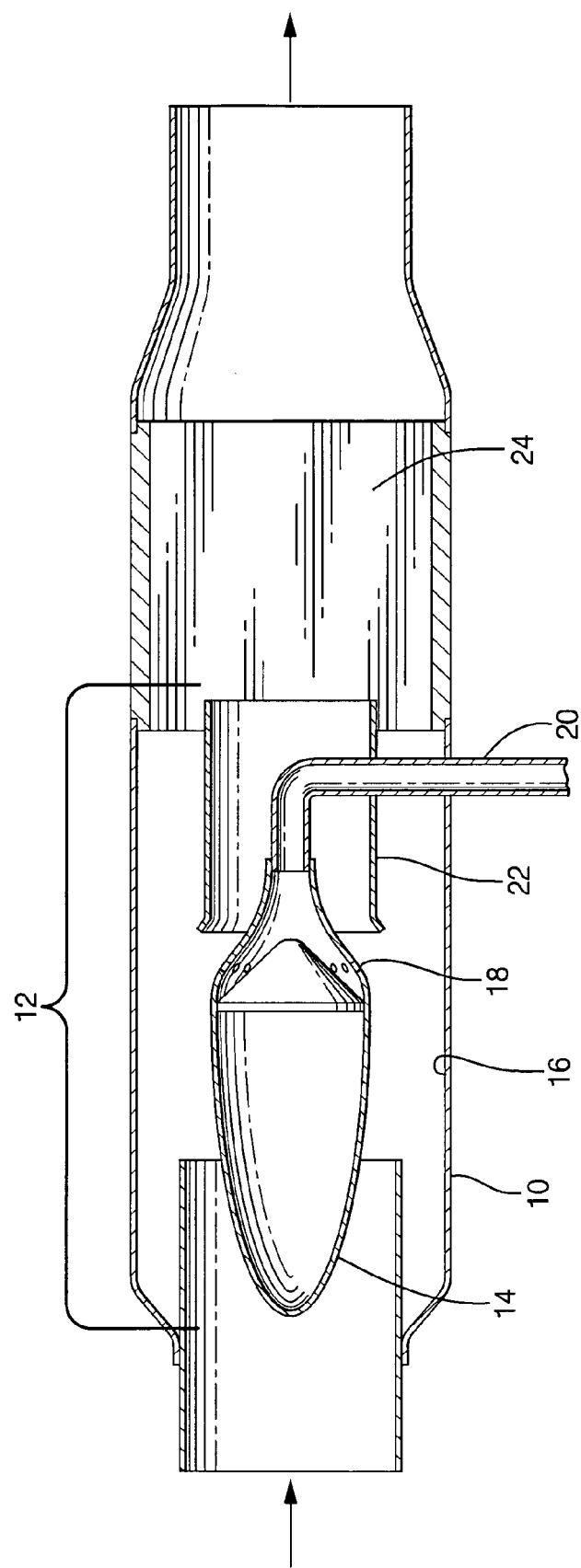
FIG. 1 is a partial cross-sectional view of an exemplary embodiment of a dynamic flow switch.

A dynamic flow switch for directing fluid flow and a method of operating the dynamic flow switch are disclosed. Briefly stated, the dynamic flow switch employs a deflector and a first fluid to direct the flow of another fluid. This apparatus eliminates the unreliability of valving and valve actuators in harsh environments. The dynamic flow switch is discussed throughout this disclosure in relation to an exhaust treatment system for convenience in discussion, with the understanding that the dynamic flow switch can readily be adapted for use in other systems (e.g., heating and ventilation systems, internal combustion engine intakes, such as during warm-up).

The terms "first," "second," and the like do not denote any order or importance, but rather are used to distinguish one element from another, and the terms "a" and "an" do not denote a limitation of quantity, but rather denote the presence of at least one of the referenced items. All ranges disclosed herein are inclusive and combinable (e.g., ranges of "up to about 25 wt %, with about 5 wt % to about 20 wt % desired," is inclusive of the endpoints and all intermediate values of the ranges of "about 5 wt % to about 25 wt %," etc.). The modifier "about" used in connection with a quantity is inclusive of the stated value and has the meaning dictated by the context (e.g., includes the degree of error associated with measurement of the particular quantity). Moreover, in describing the arrangement of exhaust treatment devices and dynamic flow switches within an exhaust system, the terms "upstream" and "downstream" are used. While these terms have their ordinary meaning, it is briefly mentioned for clarity in discussion that a device can be both "upstream" and "downstream" of a given device in certain configurations, e.g., a system comprising a recycle loop.

System devices (e.g., exhaust treatment devices) are also referred to as being "in-line" or "off-line" for ease in discussion. An "in-line" device refers to a device disposed downstream of and in fluid communication with a fluid source, wherein the "in-line" device is capable of receiving a continual flow of fluid during operation. An "off-line" device refers to a device disposed in selective fluid communication with a fluid conduit that is disposed in fluid communication with a fluid source. The component produced "off-line," however, can then be introduced into the fluid stream.

The dynamic flow switch is designed to employ flow dynamics in the controlling of the flow to a device (e.g., exhaust treatment device, or any other device). The dynamic flow switch has a deflector that can be disposed in a flow stream such that a fluid flows around the diverter. Then, depending if it is desirable to divert the fluid or to introduce the fluid to the subsequent device, the fluid can re-integrate (e.g., reform a single, undiverted stream), or can be diverted around the subsequent device and/or subsequent area. For example, if the diverter has a generally diverging-converging shape, the fluid diverges to flow over the surface of the diverter. If no displacing fluid is released, the fluid is allowed to converge and continue its flow path. If a displacing fluid is released, the fluid does not converge, but continues in the new, diverged path. The diverged path can direct the fluid into another conduit, into another device, and/or through the same conduit and/or device, but inhibit a particular flow path. The displacing fluid can be another fluid that passes through apertures disposed on the converging portion of the diverter. The flow of the displacing fluid inhibits the conversion of the fluid. The flow of the displacing fluid can optionally be enhanced with the use of igniter(s) (e.g., located in and/or near the deflector) that can ignite the displacing fluid to enhance the flow pressure and rate.

Referring now to FIG. 1, an exemplary embodiment of a dynamic flow switch, generally designated 12, is illustrated. The dynamic flow switch 12 includes: a deflector 14 disposed in a housing 10 with an inner wall 16; an aperture 18 in a downstream portion of the deflector 14; a fluid conduit 20 in operable communication with the deflector 14; and a divider 22 disposed downstream of and in fluid communication with the deflector 14.

The fluid conduit 20 is structured to introduce a second fluid to the deflector 14, while the deflector 14 is structured to change the directional flow of a first fluid (hereinafter "working fluid" for ease in discussion, e.g., an exhaust fluid) in the housing 10. As mentioned above, the deflector 14 is disposed in the conduit so as to intercept the flow through the conduit and redirect the flow as desired. The deflector 14 can have any shape suitable to alter the direction of flow of the working fluid (e.g., cylindrical, conical, elliptical, bullet-shaped, and the like). The size and shape of each portion of the deflector 14 are dependent upon the desired final flow characteristics of the working fluid. The size of the deflector 14 should be sufficient to deflect the working fluid flow such that it can be diverted around the divider 22. Desirably, the deflector 14 has a sufficient size and geometry to divert greater than or equal to about 80 volume percent (vol %) of the working fluid around the divider 22, or, more specifically, greater than or equal to about 90 vol %, or, even more specifically, greater than or equal to about 95 vol %.

In order to inhibit turbulent flows, the deflector 14 can comprise a rounded, diverging surface that gradually redirects the flow direction of the working fluid. Then, depending upon the desired flow direction, the fluid can continue in the diverted direction, with the direction maintained with the assistance of a divider 22, or the flow can be converged, by the design of the deflector 14.

The divider 22 is structured to channel the diverted working fluid along the inner wall 16. The divider 22 can be disposed downstream of and in direct fluid communication with the deflector 14, thereby enabling the divider 22 to receive the diverted working fluid flow along its outer surface and to maintain the diverted flow direction. When the flow is diverted and maintained, a second fluid (hereinafter "displacing fluid" for ease of discussion, e.g., a reformate stream), can pass through aperture(s) 18 in the deflector 14 to inhibit convergence of the working fluid flow prior to contacting the divider 22. When the displacing fluid is released, it assists in maintaining the flow direction of the diverted working fluid prior to passing through the divider 22. For example, the deflector 14, with the assistance of the displacing fluid and divider 22, can direct the working fluid flow to the outer portion of the housing 10, while the displacing fluid passes through the divider 22 into the central region of the housing 10. The divider 22 can have any shape suitable to create distinct fluid flow regions in the housing 10 (e.g., baffle, channel, cylinder, and the like). Optionally, the divider 22 can be angled to further divert (diverge and/or converge) the working fluid flow direction. In one embodiment, the divider 22 can have a diameter that is less than or equal to the largest diameter of the deflector 14 such that diverted flow passes from the outer surface of the deflector 14 across the outer surface of the divider 22.

The aperture(s) 18, disposed in the downstream portion of the deflector 14, are structured to release the displacing fluid into the housing 10 in a direction so as to continue to direct the working fluid flow direction as desired. The flow of the displacing fluid can further divert the flow of the working fluid toward the inner wall 16 of the housing 10, can retain the flow direction, and/or allow some converging of the fluid, yet, desirably direct greater than or equal to about 90 volume percent (90 vol %) of the fluid flow around the divider 22 (e.g., depending upon the amount of displacing fluid, fluid flow rates, fluid pressures, relative locations of the deflector 14 and divider 22, and the like). The aperture(s) 18, which can be arranged in any suitable arrangement and can include any suitable shape (e.g., bleed hole, bore, slot and the like, which can comprise a louver) to attain and/or retain the desired flow of the working fluid. Depending upon possible additional uses of the displacing fluid (e.g., regeneration of an exhaust treatment device), the aperture(s) 18 can be sufficient in size and number to enable the introduction of a sufficient amount of the displacing fluid in a desired period of time to attain the desired degree of regeneration.

The displacing fluid can be introduced to the deflector 14 in any fashion capable of passing the displacing fluid through the aperture(s) 18 at a sufficient pressure and rate to attain the desired flows (as described above). For example, the displacing fluid can be introduced into the deflector 14 with a fluid conduit disposed downstream of and in operable communication with the deflector 14. The displacing fluid can be introduced from an off-line source through the fluid conduit 20 into the deflector 14.

In an exemplary embodiment, the dynamic flow switch 12 can be deployed upstream of and in direct fluid communication with a system device 24 (e.g., an exhaust treatment device). The divider 22 of the dynamic flow switch 12 can be structured such that when the dynamic flow switch 12 is off (i.e., when there is no displacing fluid being released from the aperture 18), the divider 22 either directs the working fluid toward the central region of the housing 10, or does not substantially effect the flow of the working fluid (e.g., the working fluid can flow through and around the divider 22). In other words, the working fluid passes over the deflector 14, diverging as it moves toward the divider 22. As the working fluid passes over the downstream portion of the deflector 14, at least a portion of the working fluid converges, passing over the aperatures 18, and through the divider 22. The working fluid can then pass through the system device 24, with the portion that passes through the divider 22 passing through, for example, a central portion of the system device 24.

When the dynamic flow switch 12 is on, however, the displacing fluid released from the aperture 18 can assist in directing and/or maintaining the working fluid flow direction such that the working fluid flows around the divider 22, between the inner wall 16 and the housing 10. In such a fashion, the working fluid can bypass the system device 24 while the displacing fluid is directed toward and through the system device 24 (e.g., a central portion of the system device 24). It is noted that the system device 24 can be the substrate for an exhaust treatment device such that the working fluid is directed to pass through only a desired portion of the substrate (e.g., a non-catalyzed portion), while the displacing fluid passes through another portion (e.g., a catalyzed portion that needs regeneration).

An exemplary embodiment of the dynamic flow switch 12 in an exhaust treatment system, generally designated 200, is illustrated in FIG. 2. An exhaust fluid source 26 can be disposed upstream of and in fluid communication with at least one system device (e.g., a particulate filter 28, a $NO_x$ adsorber 30, a selective catalytic reduction (SCR) catalyst 32, and the like). For example, the exhaust fluid source 26 can be disposed upstream of and in fluid communication with the in-line particulate filter 28, the in-line $NO_x$ adsorber 30, and/or the in-line SCR catalyst 32.

In the system 200, the dynamic flow switch 12 is disposed to control the flow to the $NO_x$ adsorber 30 which is can be disposed downstream of and in fluid communication with the particulate filter 28, while being disposed upstream of and in fluid communication with the SCR catalyst 32. Hence, the dynamic flow switch 12 is capable of receiving working fluid from the particulate filter 28, controlling the flow of fluid to the $NO_x$ adsorber 30, and optionally directing at least a portion of the working fluid around the NOx adsorber 30, from the particulate filter 28 directly to the SCR catalyst 32. When the dynamic flow switch 12 is directing with working fluid around the NOx adsorber 30, it is receiving displacing fluid (e.g., reformate, ammonia, urea, and the like) from a second fluid source 34. This displacing fluid flows from the dynamic flow switch 12, through the NOx adsorber 30, and then through the SCR catalyst 32.

The general directional flow of exhaust fluid from the exhaust fluid source 26 can be through the particulate filter 28, the dynamic flow switch 12, the $NO_x$ adsorber 30, and the SCR catalyst 32. The dynamic flow switch 12 is structured to channel the exhaust fluid through the $NO_x$ adsorber 30 when the exhaust system is in a storage phase. When regeneration of the $NO_x$ adsorber 30 is desired, dynamic flow switch 12 is structured to direct the exhaust flow around the $NO_x$ adsorber 30 and channel the second fluid through the $NO_x$ adsorber 30. The exhaust fluid bypasses the $NO_x$ adsorber 30 and goes through the SCR catalyst 32. After passing through the SCR catalyst 32, the exhaust fluid can then be discharged into an external environment.

Another exemplary embodiment of the dynamic flow switch 12 in an exhaust treatment system, generally designated 300, is illustrated in FIG. 3. The exhaust treatment system 300 can include a second, off-line dynamic flow switch 36. The off-line dynamic flow switch 36 can be disposed in fluid communication with the second fluid source 34 and upstream of and in fluid communication with the dynamic flow switch 12. In this position, off-line dynamic flow switch 36 can allow the second fluid to be directed upstream of the particulate filter 28, e.g., for regeneration purposes. Similarly, when regeneration of the adsorbed $NO_x$ is desired, the off-line dynamic flow switch 36 can channel the second fluid to the dynamic flow switch 12. This dynamic flow switch 36 can be designed with strategic location of the divider, narrowing of the deflector, and/or employing flow characteristics (e.g., the addition of swirl, tumble, and/or vortex action) to attain the desired redirection of the second fluid. Optionally, a third fluid source (no shown), such as an inert gas source, air source, or the like, can be in fluid communication with the deflector of the off-line dynamic flow switch to attain the desired diversion of flow.

In various embodiments, exhaust treatment system 200 and 300 components can be added or removed. For example, the particulate filter 28 (which is optionally catalyzed) can be omitted in various embodiments. In other embodiments, the SCR catalyst 32 can also be omitted. Conversely, for example, additional exhaust treatment device(s), as well as dynamic flow switch(es) 12 can be added to the exhaust treatment system 200 and 300. Additional NOx adsorber(s) 30 and/or SCR catalyst(s) 32 can be added in parallel or in series, as desired for the particular stream to be treated. For example, two NOx adsorbers 30 can be employed in parallel such that when the dynamic flow switch 12 directs the second fluid in to a first NOx adsorber for regeneration, the exhaust fluid can be diverted through the second NOx adsorber before introduction to the SCR catalyst 32. Other possible exhaust treatment devices that may be employed in the exhaust treatment system include oxidation catalyst(s), plasma reactor(s) (e.g., thermal and/or non-thermal plasma reactors), sulfur trap(s), three-way catalyst(s), and the like, as well as combinations comprising any of the above mentioned devices.

As illustrated in FIGS. 2 and 3, the dynamic flow switch(es) 12 can be located in various locations, e.g., to allow reductant to be directed to a particular system device (e.g., to accomplish selective regeneration of a given exhaust treatment device), and/or to enable exhaust fluid to bypass the system device(s). The dynamic flow switch 12 can be particularly useful in harsh conditions, such as those found in an engine exhaust system. The dynamic flow switch 12 has no moving parts, which can fail over time due to repetitive use or application in severe environments. Moreover, absence of moving parts means there are no inherent limitations on size and weight as there are in mechanical valve and actuator technology. Additionally, the dynamic flow switch 12 is suited for systems like engine exhaust treatment systems, where exhaust temperatures and heavy use lead to frequent breakdown of moving valve parts. In such systems, the dynamic flow switch 12 can eliminate the need for mechanical valves, actuators, and bypass conduits.

Turning now to each component of systems 200 and 300, it is noted that the exhaust fluid source 26 can include various engines (e.g., compression ignition engines, spark ignition engines, and the like), furnaces, and the like. For example, the exhaust fluid source 26 can be a compression ignition engine operating with diesel fuel (e.g., a diesel engine). It is to be understood, however, that other fuel sources can be employed, e.g., hydrocarbon fuel(s) such as gasoline, diesel, ethanol, methanol, kerosene, and the like; gaseous fuels, such as natural gas, propane, butane, and the like; and alternative fuels, such as hydrogen, biofuels, dimethyl ether, and the like; as well as combinations comprising at least one of the foregoing fuels.

With regards to the system device(s) 24, it is noted that each system device 24 can be disposed in fluid communication with the exhaust fluid source 26. The number and arrangement of the various system device(s) 24, as well as the dynamic flow switch(es) 12, depends on the type and application of the exhaust treatment system. Generally, each system device 24 can include a substrate disposed within a housing. A catalyst and catalyst support material may, optionally, be disposed on, in, and/or throughout the substrate depending on the given device and application. For example, the SCR catalyst 32 can include a catalytic material(s), support material(s), and a substrate(s) disposed within a housing. Optionally, a retention material can be disposed between the substrate and the housing. The catalyst and support material can be washcoated, imbibed, impregnated, precipitated, and/or otherwise applied onto the substrate. Examples of catalyst materials can include, but are not limited to, platinum, palladium, ruthenium, rhodium, iridium, gold, and silver, as well as oxides, precursors, alloys, salts, and mixtures comprising at least one of the foregoing. The particular catalyst is dependent upon the catalyst function (e.g., oxidation, etc.), and catalyst location in the exhaust stream.

The second fluid source 34, which can be an off-line component of the exhaust treatment systems 200 and 300, can be disposed in fluid communication with the exhaust fluid conduit (and/or housing 10 shown in FIG. 1). It is noted that the second fluid source 34 can include various reformers (e.g., partial oxidation reformers, dry reformers, steam reformers, and the like), reactors (e.g., non-thermal plasma reactors, and the like), urea selective catalyst reduction systems, tanks comprising the desired fluid, and the like. Additionally, the second fluid source 34 can be in fluid communication with the exhaust fluid conduit in various locations (e.g., directly and/or via dynamic flow switch(es)) depending on the type and application of the system device(s) 24.

In operation, an exemplary method of controlling fluid flow with the dynamic flow switch 12 can comprise, e.g., regenerating the $NO_x$ adsorber 30 with reductant. The second fluid source 34 can supply reductant to the dynamic flow switch 12. When the exhaust treatment system is operating in storage phase, e.g., when the $NO_x$ adsorber 30 is adsorbing $NO_x$ from the exhaust fluid, the dynamic flow switch 12 is off. The exhaust fluid passes deflector 14 and is channeled to the central region of the exhaust fluid conduit by the divider 22, wherein the exhaust fluid is allowed to pass through the $NO_x$ adsorber 30. For regeneration of the $NO_x$ adsorber 30, the reductant can be introduced into the dynamic flow switch 12 and released through the aperture 18. The flow of reductant from the aperture 18 redirects the exhaust fluid around the divider 22 toward the inner wall 16 of the exhaust fluid conduit. The exhaust fluid is prevented from entering the $NO_x$ adsorber 30. Consequently, the reductant flows through the $NO_x$ adsorber 30 and regenerates the exhaust treatment device. Without being bound by theory, this mode of operation can allow for efficient treatment of exhaust without the use of moving parts.

Advantageously, as mentioned above, the systems and modes of operation disclosed herein can allow for a reduction in operating cost and increased operating life over systems utilizing mechanical valves and actuators. More particularly, the dynamic flow switch 12 can be suitable for a greater range of potential applications because the lack of moving parts allows for use of the switches in severe temperatures. Additionally, use of dynamic flow switches 12 in place of mechanical valves and actuators can achieve a size and weight reduction for a given application. Finally, the use of reformate (e.g., hydrogen and carbon monoxide ($H_2$/CO) in nitrogen ($N_2$)) can be difficult in that the $H_2$ will attack many materials, especially at the elevated temperatures of the exhaust and/or the reformate. For example, high temperature lubricants used in mechanical valves (such as graphite) are attacked by the $H_2$. Since the dynamic flow switch does not need lubrication and has no moving parts, this valve eliminates this problem.

While the invention has been described with reference to an exemplary embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An exhaust treatment system, comprising:
    an exhaust treatment device disposed in-line;
    a flow switch disposed in-line, upstream of and in fluid communication with the exhaust treatment device, wherein the flow switch comprises
        a deflector having a diverging upstream portion for diverting, along an outer surface of the deflector, a fluid stream that contacts the upstream portion;
        a divider disposed downstream of the deflector having a hollow body that includes an upstream opening and a downstream opening, configured so as to provide a first potential flow path for the fluid stream that enters the body through the upstream opening and exits the body through the downstream opening, and a second potential flow path for the fluid stream that does not enter the body; and
        an aperture located in a downstream portion of the deflector upstream of the divider for allowing a flow of a displacing fluid therethrough such that the displacing fluid inhibits the diverted stream from converging to follow the first flow path, thereby directing at least a portion of the diverted stream to follow the second flow path; and
        a displacing fluid source in fluid communication with the aperture.

2. The exhaust treatment system of claim 1, further comprising a second flow switch disposed off-line, downstream of and in fluid communication with the displacing fluid source for directing the displacing fluid to the aperture, to a different point in the exhaust treatment system, or to both the aperture and a different point in the exhaust system.

3. The exhaust treatment system of claim 1, wherein the flow switch further comprises an igniter for igniting the displacing fluid.

4. The exhaust treatment system of claim 1, wherein the exhaust treatment device is a NOx adsorber.

5. The exhaust treatment system of claim 4, further comprising
    a particulate filter disposed upstream of the flow switch, and
    a selective catalytic reduction catalyst disposed downstream of the NOx adsorber.

6. A method of treating an exhaust stream, comprising:
    generating an exhaust fluid flow;
    providing a divider having a hollow body that includes an upstream opening and a downstream opening, configured so as to provide a first potential flow path for the exhaust fluid flow that enters the body through the upstream opening and exits the body through the downstream opening, and a second potential flow path for the exhaust fluid stream that does not enter the body;
    diverting the exhaust fluid flow along an outer surface of a deflector;
    converging the diverted exhaust fluid flow;
    passing the converged exhaust fluid flow through the first flow path;
    passing the converged exhaust fluid through an exhaust treatment device where a concentration of a component of the exhaust fluid flow is reduced; and
    regenerating the exhaust treatment device by
    introducing a displacing fluid to the deflector, wherein the displacing fluid passes through an aperture in a downstream portion of the deflector and inhibits the diverted exhaust fluid flow from following the first flow path;
    passing at least a portion of the diverted exhaust fluid flow through the second flow path;
    passing the displacing fluid through the first flow path and into the exhaust treatment device; and
    regenerating the exhaust treatment device.

7. The method of claim 6, further comprising wherein when the displacing fluid inhibits the passing of the diverted exhaust fluid flow, introducing the diverted exhaust fluid flow to another exhaust treatment device.

8. The method of claim 6, further comprising igniting at least a portion of displacing fluid.

9. The flow switch of claim 6, wherein the diverting the exhaust fluid flow diverts greater than or equal to about 80 vol % of the fluid stream around the divider.

10. The flow switch of claim 9, wherein the diverting the exhaust fluid flow diverts greater than or equal to about 90 vol % of the fluid stream around the divider.

11. The flow switch of claim 10, wherein the diverting the exhaust fluid flow diverts greater than or equal to about 95 vol % of the fluid stream around the divider.

* * * * *